Sept. 5, 1939.  A. J. LIPPOLD  2,171,757
RECEPTACLE FILLING DEVICE
Filed July 22, 1936
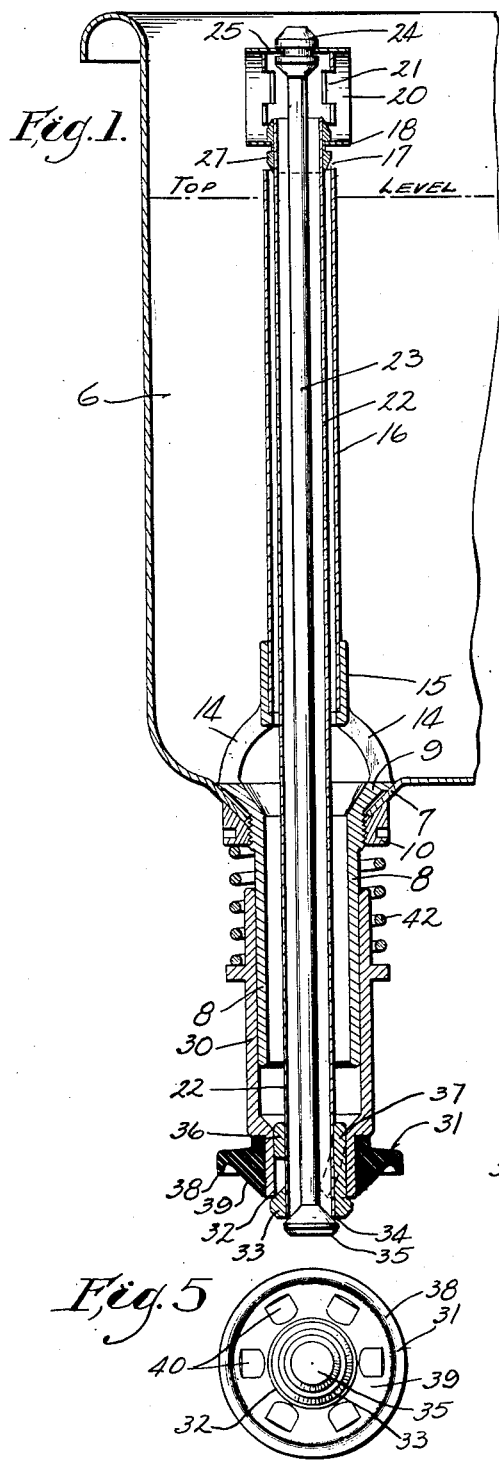
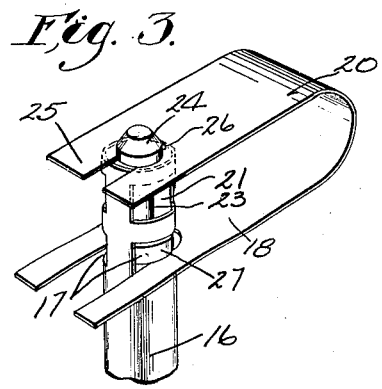
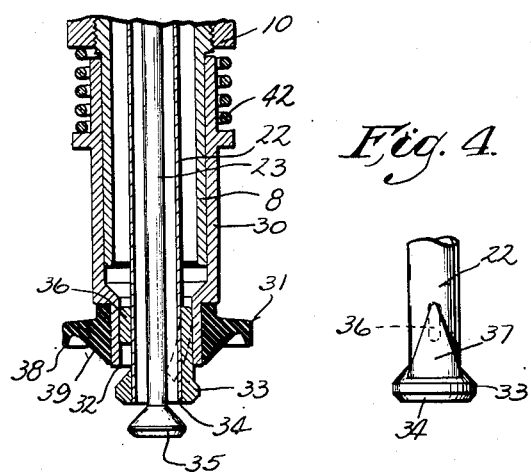
INVENTOR
Adolph J. Lippold
BY
Wheeler, Wheeler & Wheeler
ATTORNEYS Patented Sept. 5, 1939

2,171,757

UNITED STATES PATENT OFFICE 2,171,757

RECEPTACLE FILLING DEVICE

Adolph J. Lippold, Milwaukee, Wis., assignor to Cherry-Burrell Corporation, Chicago, Ill., a corporation Application July 22, 1936, Serial No. 91,841
In Great Britain May 14, 1936

33 Claims. (Cl. 226—124)

This invention relates to improvements in receptacle filling devices.

The invention is illustrated with particular reference to the filling of milk bottles, but is of more general application.

It is the primary object of the invention to provide a filling device which will uniformly fill to a predetermined level the receptacles brought into contact with its valve, such level being determined by the valve and associated mechanism irrespective of the level of liquid in the reservoir from which the valve is supplied.

More specifically, it is my purpose to provide novel and improved uniform filling valve mechanism wherein the parts are conveniently and compactly associated for mounting in a conventional reservoir and for speedy and complete dismounting for cleansing. I propose to locate all springs at points remote from the path of milk flow and to provide a compound valve in which milk flow and air flow are separately controlled, there being no tendency for the device to adhere by vacuum to the mouth of the bottle filled. Other objects will appear from the detailed description of the invention.

In the drawing:

Figure 1 is a fragmentary view in transverse section through a conventional milk reservoir in which my device is shown in vertical axial section.

Figure 2 is a fragmentary view of my device in axial section showing the valve mechanism open.

Figure 3 is a fragmentary detail in perspective of the upper end of my improved apparatus showing the detachable spring.

Figure 4 is a view in side elevation in the lower end of the milk valve stem and the milk valve applied thereto.

Figure 5 is a bottom plan view of the mechanism shown in Figure 1.

Like parts are identified by the same reference characters throughout the several views.

It will be understood, of course, that while the device is described with particular reference to the filling of milk bottles, such description is purely illustrative.

The reservoir 6 is of a type conventionally used in gravity milk bottle fillers, the normal maximum level of milk being approximated at the line indicated in Fig. 1. The maximum level is not critical, however, and may be considerably higher or lower than that indicated.

The bottom of reservoir 6 is provided with a series of filler openings surrounded by tapering flanges 7, one of which is illustrated in the drawing. Through such an opening is inserted the milk discharge pipe 8 of a bracket which includes a plug portion 9 seated internally upon the flange 7. The clamping nut 10 threaded to pipe 8 engages flange 7 externally to hold the bracket rigidly assembled upon the reservoir.

The bracket includes a spider having arms 14 and socket 15 for carrying the tubular standard 16. This standard has its sides notched at 17 to receive the resiliently yieldable end portion 18 of flat spring 20. The standard is likewise preferably, but not necessarily, ported at 21 to provide an air vent which should desirably be above the maximum level of liquid in the reservoir.

Depending centrally within the tubular standard 16 in a preferably concentric relation are the tubular valve stem 22 and the rod-like valve stem 23. The latter has a spool-shaped head 24 releasably engaged by the slotted upper terminal portion 25 of spring 20. A rivet or other projection at 26 may be releasably engaged within the upper margin of standard 16 to secure spring 20 against accidental release in the course of its resilient operation. The operator can readily lift the spring sufficiently to disengage the rivet from the standard when removal of the spring is desired.

A similar spool-shaped head 27 on the tubular valve stem 22 is engaged by the resiliently movable and longitudinally slotted lower extremity 18 of spring 20, the notches 17 in standard 16 accommodating such engagement. The spring 20 may readily be withdrawn laterally to release both of the spool-shaped heads 24 and 27 on the respective valve stems 23 and 22.

Slidable on the outer periphery of pipe 8 is a sleeve 30 carrying a bottle-engageable actuating member 31 and providing at its lower margin 32 a seat for the valve 33 which is carried by the lower end of the tubular valve stem 22 above described. The tubular stem 22 serves as an air conduit and its lower marginal portion 34 in turn provides a seat for the air valve 35 which is carried by the rod-like valve stem 23 referred to above.

Two projections on the tubular stem 22 at 36 and 37 respectively, guide the tubular stem 22 within the reduced lower terminal portion of sleeve 30 while providing ample clearance for the passage of milk. The member 36 is simply a spacer of narrow axially elongated form as shown in dotted lines in Fig. 4, but the member 37 is a boss of cylindrical contour and triangular elevation as clearly appears from Fig. 4. It is the function of this boss to divide the milk stream and to serve as a baffle in deflecting the milk toward the left as viewed in Fig. 1 and Fig. 2, thereby affording a space, free of milk, through which air may readily escape from the bottle and ascend through the tubular conduit 22 and ports 21.

The bottle-engageable actuating member 31 is designed particularly for use with milk bottles and might require changes for use with other receptacles. It is preferably made of some yieldably elastic material such as rubber, rigidly encircling the reduced lower extremity of sleeve 30 and provided adjacent its outer peripheral margin with an overhanging skirt 38 engageable over the mouth of a bottle. Within this skirt is a conically tapered portion 39 receivable partially into the mouth of the bottle and terminating adjacent the lower valve seat margin of sleeve 30. The generally conical surface of the elastic cushion member 31 is preferably interrupted at intervals by slightly flattened areas or slightly concave areas 40 which are insufficient to prevent the tight seal of member 31 upon the mouth of the bottle when such member is slightly deformed under pressure, but which elastically resume their form upon the release of such pressure to permit air to enter the bottle and to relieve the vacuum which might otherwise be occasioned by the withdrawal of the bottle from the apparatus.

The entire sleeve 30 is axially slidable upon the pipe 8, being normally forced downwardly by a compression spring 42. It will be understood that relative movement between the tank or reservoir 6 and a bottle will cause pressure of the mouth of the bottle upon the rubber actuating member 31 to lift sleeve 30 against the compression of spring 42 and thereby to relieve the pressure on the arm 18 of the upper spring 20. This upper spring is normally held with its arms parallel in the position shown in Fig. 3 by the superior compression of spring 42, but upon the relief of such compression the bias of arm 18 will cause such arm to lift the head 27, valve stem 22, and valve 33, with the result that for some little distance the sleeve 30, tubular stem 22, and valve 33 will move in unison without displacing valve 33 from its seat 32.

This action necessarily opens valve 35 by the upward lifting of its seat 34 away from the valve, the valve remaining stationary due to the end of spring 20 which is held securely on the upper end of standard 16. This permits any liquid trapped in the vent conduit within tubular valve stem 22 to flow immediately into the receptacle. There is always a tendency for the liquid in reservoir 6 to seek its own level in the vent pipe, but the fact that the air valve opens first enables the vent pipe to be drained at the beginning of the operation so that it is empty before the filling of the receptacle from the reservoir is commenced.

The continued upward pressure of the receptacle upon the rubber plug 31 finally reaches a point where the spring arm 18 reaches the limit of its movement in the notches 17 of standard 16. This brings the tubular air conduit and valve stem 22 to rest, and now the further movement of sleeve 30 draws the seat 32 away from valve plug 33 to allow milk to flow from the reservoir into the receptacle. It is immaterial how long the valves remain open after the receptacle is filled, since the only effect of the valve opening after the receptacle is full is the rising of liquid in the vent tube 22 to a level corresponding with that of the reservoir. The rubber cushion 31 seals the mouth of the container, and the container remains filled with liquid to its mouth.

When the bottle is lowered away from the reservoir the sleeve 30 moves downwardly under compression of spring 42 and the first effect of such movement is to bring the seat 32 into engagement with valve 33, thus cutting off communication between the reservoir and the filled container. The continued downward movement of sleeve 30 now carries with it valve 32 and its tubular stem 22 against the bias of arm 18 of spring 20 until ultimately seat 34 is engaged with valve 35 to cut off the vent from communication with the filled container. This traps within the vent all of the liquid which flowed therein to the height of the liquid level in the reservoir as above described except a small portion thereof which returns to the receptacle in the interval between the successive closing of valves 33 and 35. The vent tube 22 and valve 35 provide a meter which allows a limited return equal to the lessened displacement during relative withdrawal of valve 35 from the receptacle, but completely shuts off such return as soon as valve 35 has closed the vent. This provides means for exactly predetermining the liquid level in the receptacle, and prevents such liquid from overflowing the container or dripping during the change of bottles or other receptacles beneath the filler.

In the operation of filling mechanisms of the described class the speed of operation is frequently varied, and therefore the quantity of liquid which will enter a vent during the filling operation cannot be precisely predetermined. Therefore it is necessary to employ a vent valve which will, when closed, completely shut off liquid return to the receptacle, and this complete shut-off of liquid return must be completed before the mouth piece of the receptacle is withdrawn from the capping plug 31. In the construction illustrated, the fixed valve 35 limits the downward movement of tube 22, and the valve 33 limits the downward movement of the outer tube extension 30 in two stages, i. e., the first engages the extension with the liquid supply valve and the second stage transmits motion to the inner tube until it engages the fixed valve 30 which thus positively limits all further downward movement.

So long as liquid remains in the reservoir sufficient to fill the container, the completion of each filling operation will always completely fill the closed system which includes pipe 8, the container which is filled, and the tubular stem 22. The closing of the valves incident to the removal of the container will seal the liquid in pipe 8, sleeve 30, and the tubular stem 22, and will thus interrupt the system always at the same point to establish a constant level in the series of containers filled in the use of this device.

The wedge-shaped baffle or divider 37 is of particular importance in filling bottles with very heavy or viscous liquids which would otherwise form a substantially continuous film in the shape of an annular curtain which would prevent the air from escaping freely from the container. Such a film is essentially divided by the baffle herein disclosed, and thus the air is always free to escape without impeding the filling operation.

By simply withdrawing the spring 20 in a lateral direction it will be apparent that all of the several parts with the exception of the standard 16, the bracket, and its clamping nut 10, are instantly released for cleaning. When necessary, the bracket itself may then be removed from the tank by simply unscrewing the single nut 10.

I claim:

1. Receptacle filling mechanism, including the combination of a pair of concentric tubes forming between them a supply duct adapted to deliver liquid into a receptacle while permitting venting through the inner tube, bearing means spaced axially of one of said tubes adjacent the opposite ends thereof for guiding it and for accommodating relative movement between said tubes resiliently yielding means for extending the delivery end of the outer tube, means for resiliently urging the inner tube in the opposite direction with less force and extent, a relatively fixed imperforate valve for normally closing the vent tube, an annular valve secured to said vent tube in a position to close the liquid supply tube, and an annular cap plug secured to the exterior of the supply tube extension in a position to be engaged by a receptacle mouth piece to retract the extension, said supply tube extension being adapted to transmit its motion of extension through the annular valve to actuate the vent tube into seating relation with said fixed valve, whereby said liquid supply valve and vent valve will be closed successively while a withdrawal of the receptacle is permitting said extension to return to normal position.

2. In a receptacle filling mechanism having concentric conduit walls forming liquid supply and vent passages, the combination with such walls, of a resiliently yielding cap plug for the receptacles to be filled, and means for completely closing the liquid supply and vent passages successively preparatory to a retraction of the receptacle from said plug, said means being adapted to prevent return of any vented liquid to the receptacle after its retraction from said plug, said means and at least one of said conduit walls being bodily removable from the other of said conduit walls for cleaning, and being provided with a single detent for retaining them in operative relation pending such removal.

3. In a device of the character described, the combination with a bracket provided with means for its attachment to a reservoir, a tubular standard mounted on said bracket and having portions notched on opposite sides near its upper end, a yoke-shaped flat spring having a forked upper arm mounted upon the upper end of said standard and a lower arm forked for entry into said notches, a vent tube suspended within the standard from one of said portions of said spring, an imperforate valve for the lower end of the vent tube having a stem secured to the upper arm of said spring, a depending liquid supply tube carried by said standard and provided with a spring actuated telescoping extension, a cap plug carried by said extension and adapted to be actuated by the mouth piece of a receptacle to be filled while the latter is pushed upwardly against said plug, and an annular valve carried by the vent tube in a position to normally close the liquid supply tube, said vent tube and the valves being freely removable when the forked spring is withdrawn.

4. In a device of the character described, the combination with a reservoir, of a discharge pipe provided with an axially movable sleeve having a terminal valve seat, a spring acting on said sleeve in a direction to extend it upon the pipe, a receptacle closure carried by said sleeve adjacent said seat and provided with a sealing element generally conforming to the mouth of a bottle but provided on its bottle engaging face with resiliently yieldable spacing means adapted to provide a vent directly at a bottle mouth except when compressed, said means being deformable under pressure of said spring to enable said element to seal the bottle only when said means is deformed at substantially full spring pressure, a support mounted in said reservoir, a valve coacting with said seat and provided with a tubular stem constituting an air relief conduit and leading along said support to a point above the liquid containing portion of the reservoir, spring means carried by said support and acting upon said stem yieldably in a direction to lift it when the pressure of said sleeve upon its valve is relieved, means limiting the lifting movement of said stem, and an air relief valve provided with a mounting carried by said support and extending through said stem into operative relation to said second seat, said air relief valve being adapted to prevent return of vented liquid to a filled receptacle after the receptacle has been withdrawn from the closure carried by the extension sleeve.

5. In a device of the character described, the combination with a pair of valves one of which is centrally apertured and provided with a seat engaged by the other, of stems for the respective valves one of which is housed within the other, yieldable fluid discharge means providing a seat for the apertured valve, a spring opposing the yielding of said means, a support for the respective valve stems, and a single spring constituting the sole means of mounting said stems from said support.

6. In a device of the character described, the combination with a pair of valves one of which is centrally apertured and provided with a seat engaged by the other, of stems for the respective valves one of which is housed within the other, yieldable fluid discharge means providing a seat for the apertured valve, a spring opposing the yielding of said means, a support for the respective valve stems, and a single spring constituting the sole means of mounting said stems from said support, said spring having a relatively fixed arm engaged with one of said stems and with said support, and a relatively yieldable arm weaker than said first mentioned spring and opposed thereto in the support of the stem for the apertured valve.

7. In a device of the character described, the combination with a pair of valves one of which is centrally apertured and provided with a seat engaged by the other, of stems for the respective valves one of which is housed within the other, yieldable fluid discharge means providing a seat for the apertured valve, a spring opposing the yielding of said means, a support for the respective valve stems, and a single spring constituting the sole means of mounting said stems from said support, said spring having a plurality of arms respectively slotted and detachably engaged with the respective stems of said valve, one of said arms being in relatively fixed mounting upon said support and the other of said arms being yieldable in the support of the stem with which it is connected.

8. In a device of the character described, the combination with a bracket and a tubular support mounted thereon and provided with a notch in its side, of a tubular valve stem extending through said support and having a grooved head exposed at said notch, a second valve stem extending through the first and having an exposed head, and a spring in detachable connection with said last mentioned head and in relatively fixed relation to said support, said spring having a yieldable arm in detachable connection with said grooved head.

9. In a device of the character described, the combination with a tubular support having oppositely disposed notches, of a tubular valve stem extending through said support and having a grooved head exposed at said notches, a second valve stem extending through the first valve stem and to said support and having a head exposed above said support, and a U-shaped spring having legs provided with corresponding notches and respectively connected with the heads of the respective valve stems and releasable therefrom upon lateral movement with respect to said stems.

10. In a device of the character described, the combination with a tubular support having oppositely disposed notches, of a tubular valve stem extending through said support and having a grooved head exposed at said notches, a second valve stem extending through the first valve stem and to said support and having a head exposed above said support, and a U-shaped spring having legs provided with corresponding notches respectively connected with the heads of the respective valve stems and releasable therefrom upon lateral movement with respect to said stems, together with valves connected with the respective stems and means providing valve seats with which said valves coact, said valves, stems, and means being freely disengageable from said support upon the withdrawal of said spring.

11. In a device of the character described, the combination with liquid supply and air relief valves concentrically arranged and provided with means controlling their successive opening and closing, of an actuating device for said valves including a receptacle closure deformable under pressure to fit closely to a receptacle to be filled and having means including an exposed receptacle-engaging face elastically biased for movement upon relief of such pressure to provide an air bleed to such a receptacle while the receptacle is separating from said closure.

12. In a device of the character described, the combination with liquid supply and air relief valve means and coacting means providing seats therefor, of mechanism providing guides for relative movement between said valve means and seat means, and mechanism controlling such movement for successive opening and closing movements relatively between the valve means and the seat means, and a closure for actuating said mechanism upon pressure engagement with the mouth of a receptacle to be filled, said closure comprising an elastic body having an exposed face provided with yieldable portions projecting beyond adjacent portions thereof for engagement with the mouth of the closure to provide air vents closable upon deformation of said body under pressure of the mouth of the receptacle.

13. In a device of the character described, the combination with a filler valve mechanism, of a valve actuating means comprising a deformable body having an exposed face with the general contour of the mouth of the receptacle to be filled, whereby to constitute a closure therefor, said body having portions of its closure face yieldably positioned at differing levels to afford air vents past said closure directly past the receptacle to be filled except when said body is deformed under pressure of a receptacle mouth.

14. In a device of the character described, a temporary receptacle closure comprising a deformable body having a tapered surface adapted to coact with the mouth piece of a receptacle to be filled, such surface being relieved to provide air vents to the interior of said receptacle while such receptacle is moving into or out of engagement with the body, said body being sufficiently yieldable to seat tightly against the receptacle to close said vents under pressure.

15. In a liquid dispensing apparatus including a dispensing tube, a conical valve member extending into the tube, said valve being provided with a vent stem extending upwardly into the tube, means mounting the tube and vent stem for relative axial movement for the opening and closing of the valve member respecting the tube, whereby to permit discharge of liquid from the tube over the conical surface of the valve, and a deflector member arranged with its base overlapping a portion of the upper end of the conical valve member remote from the tube engaging base thereof, and having a bearing surface in substantial contact with the inner wall of the tube, whereby to direct liquid away from that portion of the valve member immediately below the deflector member.

16. In a liquid dispensing apparatus, the combination with a dispensing tube and an inner tubular valve stem and means mounting said tube and stem for relative axial movement, of a valve of generally conical form carried at the lower end of said valve stem and adapted at its larger diametered portion to engage the end of said tube to control discharge through said tube, said stem being ported below said valve member, and a deflector comprising a bearing closing a portion of the annular space between said stem and tube over a portion of the upper end of the conical valve member, whereby to intercept flow over said last mentioned valve member portion and thereby to provide a free opening through the discharge from said tube affording access for air to the port of said stem.

17. In a device of the character described, the combination with an annular conical valve body centrally vented, of a tubular stem with which the vent communicates, and a tubular passage provided with a seat for said body, said stem including a portion contiguous to said body and overlapping the upper end thereof in substantially bearing contact with said passage, whereby to obstruct flow over a portion of the periphery of said body and to afford free access through the vent of said body to said stem.

18. In a device of the character described, the combination with a delivery spout having a valve seat, of a valve stem spaced from said seat and provided with a valve member coacting therewith, and means constituting a guide for the movement of said stem through said seat and providing a baffle shielding a portion of said seat from the material going through the central portion of said spout, said stem having an opening through said valve to receive air from the space beneath that portion of the seat which is protected by the guide means and baffle.

19. In a liquid dispensing apparatus including a dispensing tube, a conical valve member extending into said tube with the base of said member forming a closure for the end of the tube, said valve being provided with a vent stem extending upwardly into the tube, said tube and vent being aranged to have relative axial movement to permit discharge of the liquid from the tube over the conical surface of said valve, and a deflector member arranged with its base overlapping a portion of the upper end of said conical valve member remote from the tube engaging base thereof and being provided with a triangular upper portion to direct the liquid away from that portion of the valve member immediately below said deflector.

20. The combination with a reservoir, of a discharge pipe provided with an axially movable sleeve having a terminal valve seat, a spring acting on said sleeve in a direction to extend it upon the pipe, a receptacle closure carried by the sleeve adjacent the seat, a support mounted in the reservoir, a valve co-acting with the seat and provided with a tubular stem constituting an air relief conduit and leading along said support to a point above the liquid containing portion of the reservoir, said stem being provided with a port adapted to vent a receptacle engaged by said closure, a vent valve controlling the port and provided with a second stem within said first mentioned stem, and a single detent means releasably connecting said stems removably to said support.

21. The combination with a reservoir, of a discharge pipe provided with an axially movable sleeve having a terminal valve seat, a spring acting on said sleeve in a direction to extend it upon the pipe, a receptacle closure carried by the sleeve adjacent the seat, a support mounted in the reservoir, a valve co-acting with the seat and provided with a tubular stem constituting an air relief conduit and leading along said support to a point above the liquid containing portion of the reservoir, said stem being provided with a port adapted to vent a receptacle engaged by said closure, a vent valve controlling the port and provided with a second stem within said first mentioned stem, and a single detent means releasably connecting said stems removably to said support, said detent means comprising a spring clip having an anchorage portion fixing said second stem with reference to said support and having a resilient portion in releasable connection with said tubular stem for maintaining it yieldably in a predetermined position respecting said support.

22. In a device of the character described, a temporary bottle closure comprising a deformable body having an exposed face of the general contour of the mouth of the receptacle to be filled, said body comprising yieldable supporting means projecting from a portion of said face, deformable under pressure to permit said face to seal the mouth of the receptacle, but adapted, on relief of said pressure, to force said face away from the mouth of the receptacle, whereby to vent the receptacle directly at its mouth.

23. In a device of the character described, the combination with a discharge port providing a valve seat, of a valve engageable with said seat and provided with a tubular stem providing a second seat, a second valve engageable with the second seat and provided with an inner stem inside of said tubular stem, a support for the mounting of said stems provided with a slot, means operatively connecting the inner stem to the top of said support, and means extending into a slot of said support and engaging said tubular stem.

24. In a device of the character described, the combination with a discharge port providing a valve seat, of a valve engageable with said seat and provided with a tubular stem providing a second seat, a second valve engageable with the second seat and provided with an inner stem inside of said tubular stem, a support for the mounting of said stems provided with a slot, means operatively connecting the inner stem to the top of said support, and means extending into a slot of said support and engaging said tubular stem, said last mentioned means constituting a resiliently mounted portion of said first mentioned means.

25. In a device of the character described, the combination with discharge means providing a valve seat, of a first valve engaging said seat and provided with a tubular stem and with a vent port, a second valve controlling said vent port and provided with a second stem in said tubular stem, a valve support, and detent means mounted on said support and releasably connected with the several stems.

26. In a device of the character described, the combination with discharge means providing a valve seat, of a first valve engaging said seat and provided with a tubular stem and with a vent port, a second valve controlling said vent port and provided with a second stem in said tubular stem, a valve support, and detent means mounted on said support and releasably connected with the several stems, said detent means including relatively yieldable portions in resilient connection adapted yieldably to accommodate relative movement between said stems while supporting the several valves in operative relation.

27. In a device of the character described, the combination with discharge means providing a valve seat, of a first valve engaging said seat and provided with a tubular stem and with a vent port, a second valve controlling said vent port and provided with a second stem in said tubular stem, a valve support, and detent means mounted on said support and releasably connected with the several stems, said detent means comprising a single member having separate portions individually supporting the several stems from said support for independent functioning.

28. In a liquid dispensing apparatus including a dispensing tube, a conical valve member extending into said tube with the base of said valve member forming a closure for the end of the tube, said valve member being provided with a vent stem extending upwardly into the tube, said tube and vent stem being arranged to have relative axial movement to permit discharge of the liquid from the tube over the conical surface of said valve member, and a deflector member arranged with its base overlapping a portion of the upper end of said conical valve member free of contact with the tube-engaging base thereof and being provided with a tapered upper portion to direct the liquid away from that portion of the valve member immediately adjacent the lower portion of said deflector.

29. In a liquid dispensing apparatus including a dispensing tube, a conical valve member extending into the tube, said valve member being provided with a vent stem extending upwardly into the tube, means mounting the tube and vent stem for relative axial movement for the opening and closing of the valve member respecting the tube, whereby to permit discharge of liquid from the tube over the conical surface of the valve member, and a deflector member arranged with its base overlapping a portion of the upper end of the conical valve member free of contact with the tube-engaging base thereof and having a bearing surface in substantial contact with the inner wall of the tube, whereby to direct liquid away from that portion of the valve member immediately adjacent the lower portion of the deflector member.

30. The combination with a reservoir, of a discharge pipe provided with an axially movable sleeve having a terminal valve seat, a spring acting on said sleeve in a direction to extend it upon the pipe, a receptacle closure carried by the sleeve adjacent the seat, a support mounted in the reservoir, valve means co-acting with the seat and provided with tubular stem means constituting an air relief conduit and leading along said support, said stem means being provided with a port adapted to vent a receptacle engaged by said closure, a vent valve controlling the port and provided with a second stem within said first mentioned stem means, and a single detent means releasably connecting said stems removably to said support, said detent means comprising a spring clip having an anchorage portion fixing said second stem with reference to said support and having a resilient portion in releasable connection with said tubular stem means for maintaining it yieldably in a predetermined position respecting said support.

31. In a device of the character described, the combination with a discharge port providing a valve seat, of a valve engageable with said seat and provided with a tubular stem providing a second seat, a second valve engageable with the second seat and provided with an inner stem inside of said tubular stem, a support for the mounting of said stems, means operatively connecting the inner stem to the top of said support in fixed relation thereto, and a resiliently mounted portion on said means engaging said tubular stem to releasably maintain it in operative position relative to said support.

32. In a device of the character described, the combination with liquid supply and air relief valves carried by stem means concentrically arranged with a tubular liquid supply means and provided with means controlling their successive opening and closing, of an actuating device for said valves including a receptacle closure deformable under pressure to fit closely to a receptacle to be filled and having means including an exposed receptacle-engaging face elastically biased for movement upon relief of such pressure to provide an air bleed to such a receptacle while the receptacle is separating from said closure.

33. In a liquid dispensing apparatus, the combination with a dispensing tube and an inner tubular valve stem and means mounting said tube and stem for relative axial movement, of a valve of generally conical form carried at the lower end of said valve stem and adapted at its larger diametered portion to engage the end of said tube to control discharge through said tube, said stem being ported to provide an air vent opening, and a deflector comprising a bearing intermediate said dispensing tube and said stem and having its base in intimate overlapping contact with a portion of the upper end of said conical valve member free of contact with the dispensing tube engaging base thereof, thereby closing a portion of the annular space between said stem and said dispensing tube over a portion of said conical valve member, whereby to intercept flow over said last mentioned valve member portion and thereby to provide a free opening through the discharge from said tube affording access for air to the port of said stem.

ADOLPH J. LIPPOLD.